(12) United States Patent
Cornelius et al.

(10) Patent No.: US 7,506,305 B2
(45) Date of Patent: Mar. 17, 2009

(54) DYNAMIC CONTEXTUAL HELPER USER INTERFACE

(75) Inventors: Aaron Cornelius, Verona, WI (US); David Fong, Kirkland, WA (US); Jeremy Mercer, Woodinville, WA (US); Giovanni Stallo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 10/618,919

(22) Filed: Jul. 14, 2003

(65) Prior Publication Data

US 2005/0015639 A1  Jan. 20, 2005

(51) Int. Cl.
*G06F 9/44* (2006.01)
*G06F 3/00* (2006.01)

(52) U.S. Cl. .............. 717/113; 715/708; 717/105; 717/111; 717/125

(58) Field of Classification Search ............ None
See application file for complete search history.

(56) References Cited

U.S. PATENT DOCUMENTS

| | | | | |
|---|---|---|---|---|
| 5,999,190 A | * | 12/1999 | Sheasby et al. | 345/589 |
| 6,115,544 A | * | 9/2000 | Mueller | 714/57 |
| 6,225,998 B1 | * | 5/2001 | Okita et al. | 715/853 |
| 7,165,194 B2 | * | 1/2007 | Paradkar | 714/57 |
| 2002/0083377 A1 | * | 6/2002 | Clauss et al. | 714/57 |
| 2003/0200483 A1 | * | 10/2003 | Sutton | 714/25 |
| 2004/0034847 A1 | * | 2/2004 | Joffrain et al. | 717/113 |
| 2004/0261012 A1 | * | 12/2004 | Balsiger | 715/508 |

OTHER PUBLICATIONS

Rand Morimoto, "Overview of BizTalk Server", May 1, 2002, Online, [Retrieved on Sep. 1, 2006] from <http://www.samspublishing.com/articles/printerfriendly.asp?p=26551$rl=1> Total 9 pages.*

* cited by examiner

*Primary Examiner*—Michael J Yigdall
(74) *Attorney, Agent, or Firm*—Workman Nydegger (57) ABSTRACT

A visual design surface that identifies configuration errors to a user in an inconspicuous manner is disclosed. Shapes representing software artifacts are arranged on the design surface. Each shape may have one or more configuration parameter. The parameters associated with each shape are analyzed to locate configuration errors. When an error is identified, an error icon is placed next to the shape. The user may select the icon and be presented with one or more proposed solutions.

20 Claims, 6 Drawing Sheets

DYNAMIC CONTEXTUAL HELPER USER INTERFACE

FIELD OF THE INVENTION

Aspects of the present invention relate to visual design surfaces. More specifically, aspects of the present invention provide a visual design surface that includes icons representing configuration errors and that provide proposed solutions.

BACKGROUND

Computer applications that include visual design surfaces are commonly used to generate artifacts such as computer code or to automate processes. On a visual design surface, these artifacts are typically represented by shapes. The shapes placed on the visual design surface are often arranged in a particular order and connected together in a particular fashion to perform specific functions. Each of the shapes also typically includes configuration parameters that are set by the user. After the user lays out the pattern of shapes and sets the appropriate configuration parameters, the design is compiled.

During the compilation process errors are identified and presented to the user. For example, if a variable has not been initialized a compilation error identifying this error is presented to the user. There are several disadvantages in waiting to identify errors until the compilation process. One disadvantage is that with large designs, it can be difficult for a user to remember the intended function or configuration of an artifact at a later time.

Systems that perform background compilation have been used to present errors to a user during the design process. Such systems typically list identified errors. The list of errors can be distracting to the user. Moreover, the user may realize that certain errors will be created because of the order in which the design takes place and not wish to be distracted by a list of errors.

Therefore, there is a need in the art for systems and methods that present configuration errors to a user using a visual design surface such that the presentation method is inconspicuous and minimizes distractions to the user.

BRIEF SUMMARY

Aspects of the present invention address one or more of the issues mentioned above, thereby providing a visual design surface that identifies configuration errors to a user in an inconspicuous manner to minimize distractions and interruptions in design workflow. Inconspicuous icons also provide a means for a user to look at a diagram and pinpoint errors. A plurality of shapes each represent different functions and have configuration parameters. As used herein, "configuration parameters" include characteristics of individual shapes, relative positioning of shapes, containment, connections between shapes and any other design parameters set by a user of a visual design surface. The configuration parameters are analyzed to determine configuration errors. When an error is identified, an error icon may be placed next to the shape. The user may select the icon and be presented with one or more proposed solutions. The configuration parameters are periodically checked and error icons are removed when configuration errors are no longer present.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
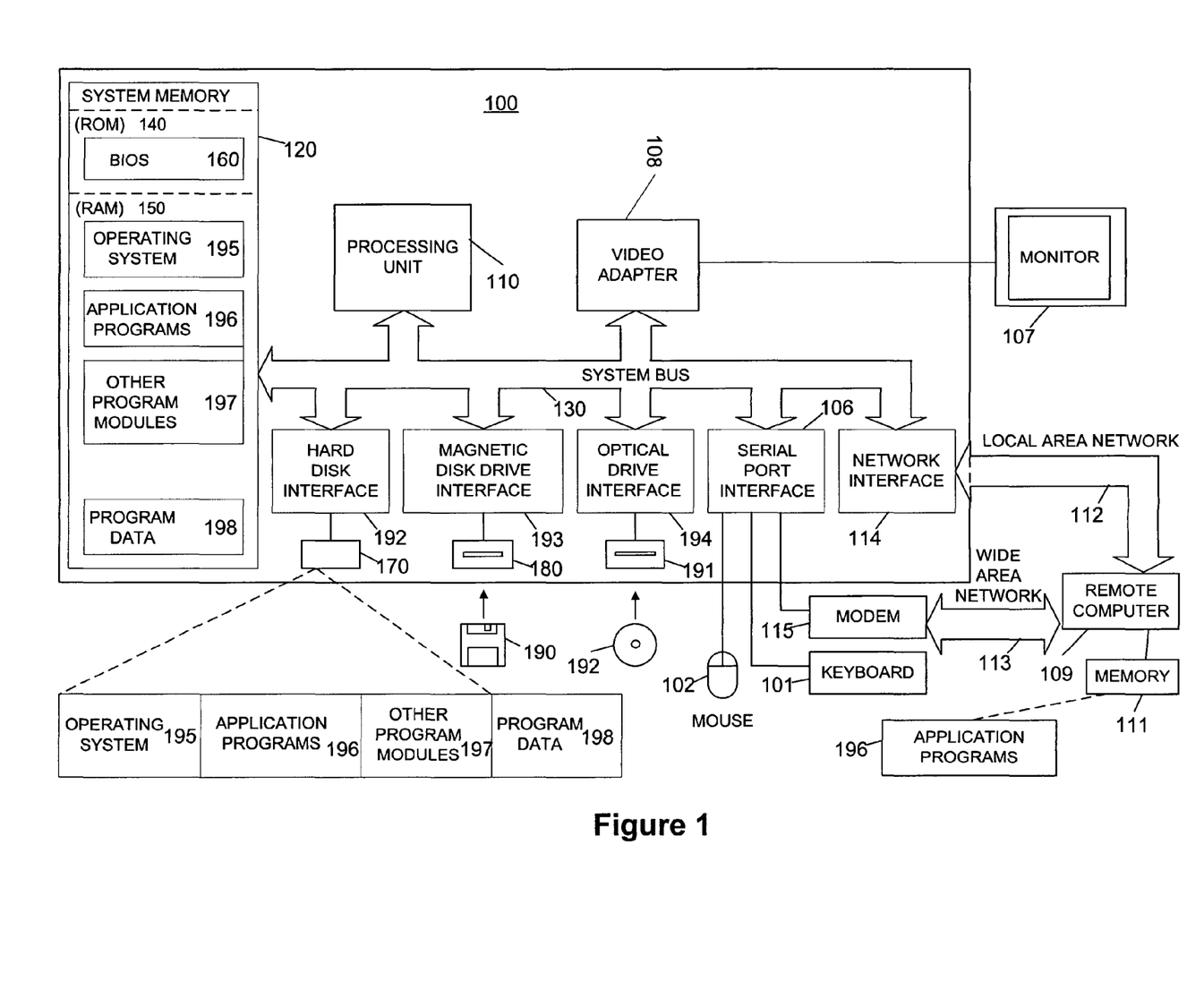
FIG. 1 shows a functional block diagram of a conventional general-purpose computer system.

FIG. 1 is a functional block diagram of an example of a conventional general-purpose digital computing environment that can be used to implement a visual design surface in accordance with various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
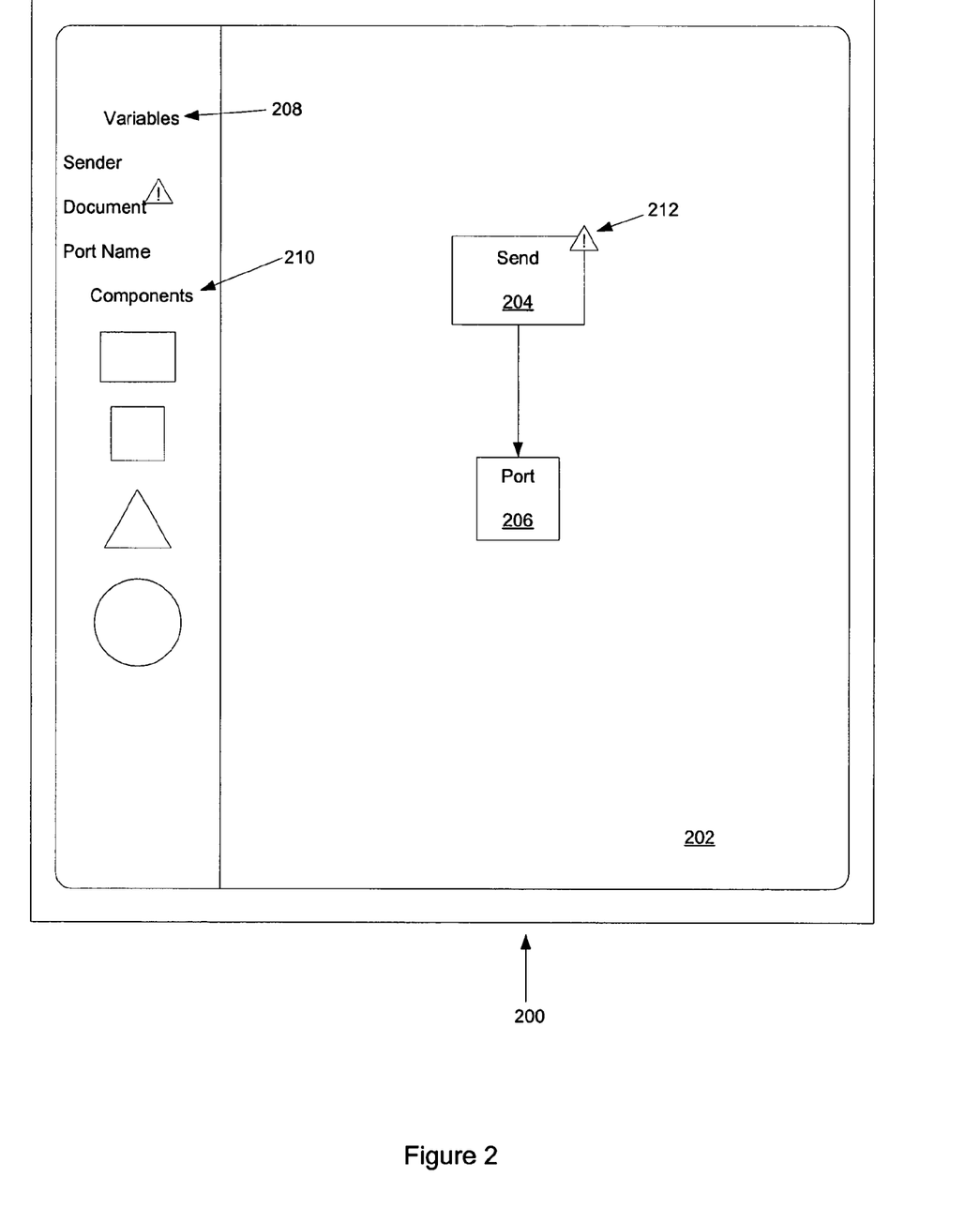
FIG. 2 shows a visual design surface in accordance with an embodiment of the invention.

FIG. 2 illustrates a visual design surface 200 in accordance with an embodiment of the invention. Design surface 200 may be a user interface that allows a user to interact with a design application, such as BizTalk Orchestration Designer™, and may be displayed on a display device, such as monitor 107. Design surface 200 may include a design section 202 that includes several shapes selected by a user, such as shapes 204 and 206. Each shape is associated with a software artifact that performs a specific function. Shape 204, for example, may represent a software artifact for sending data to a port. A user may create applications by arranging and connecting a plurality of shapes in design section 202. After a user completes the design of an application in design section 202, the application may then be compiled into an executable format in a conventional manner. In one embodiment, the application is used to implement a distributed business process.

Design surface 200 may also include additional sections, such as a variable section 208 that lists and defines variables and other data. A component section 210 may be included to display various shapes that may be used in design section 202. The user may add a shape to design area 202 by selecting and dragging the shape from component section 210 to design section 202.

Each shape in design section 202 includes one or more configuration parameters. As the user interacts with the design surface, configuration parameters are checked to ensure that they are in compliance with a predetermined set of rules. For example, send shape 204 may include a configuration parameter for identifying a protocol to use when sending data to port shape 206. A rule may require the protocol configuration parameter of send shape 204 to match the protocol used by port shape 206. The predetermined set of rules may relate to the context in which a shape is being used. For example, a set of send rules may be used when a send/receive shape is used to send data. When the rule is violated, an inconspicuous icon, such as icon 212 may be displayed next to the shape to alert the user.

Figure 3:
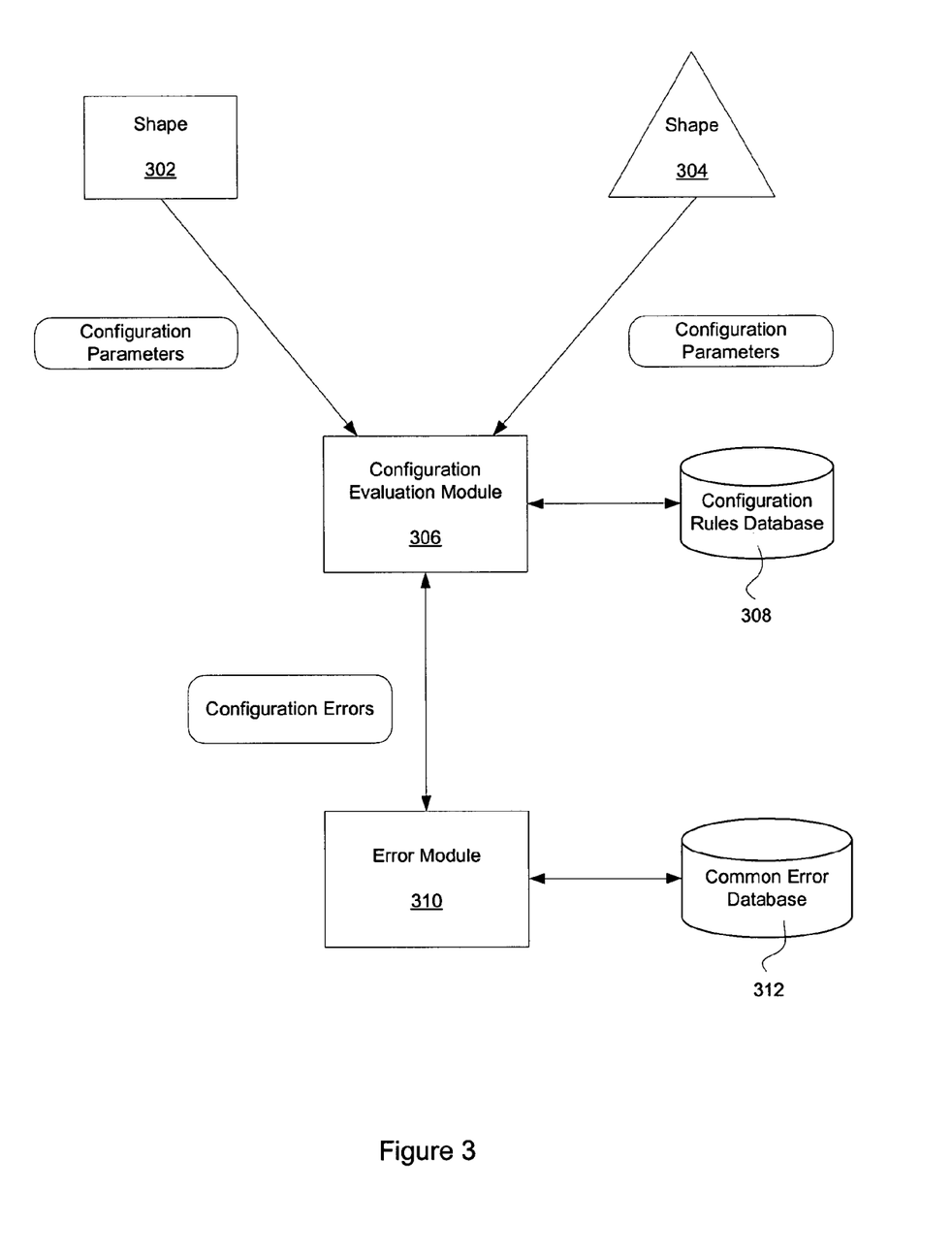
FIG. 3 shows a configuration error system in accordance with an embodiment of the invention.

FIG. 3 shows a configuration error system in accordance with an embodiment of the invention. As shown in FIG. 3, configuration parameters for a first shape 302 and configuration parameters for a second shape 304 are evaluated by a configuration evaluation module 306. Two shapes are shown for illustration purposes only and with the understanding that configuration evaluation module 306 may analyze configuration parameters for several connected and/or unconnected shapes. Configuration evaluation module 306 may access a database of configuration rules 308. Configuration evaluation module 306 may transmit any configuration errors to an error module 310. Error module 310 may access a common error database 312. Common error database 312 contains groups of errors under common errors. For example, when a required port is not connected, configuration evaluation module 306 may identify several errors in addition to an unconnected port error. Common error database 312 may include all of the errors under the common error of "port not connected." Error module 310 may use this information to determine a single error when related errors are detected.

Displaying a limited number of messages allows the user to quickly identify errors and correct them. In the example given above, assume that a required port not being connected results in fifteen configuration errors that are all a result of the port not being connected. The design experience is improved when a user is presented with an abbreviated list of the most important proposed solutions rather than an exhaustive list of all proposed solutions. When presented with multiple proposed solutions, the user must first determine if there is an association between the proposed solutions or a common cause. As described above, error module 310 may be configured to perform this feature for the user.

Figure 4:
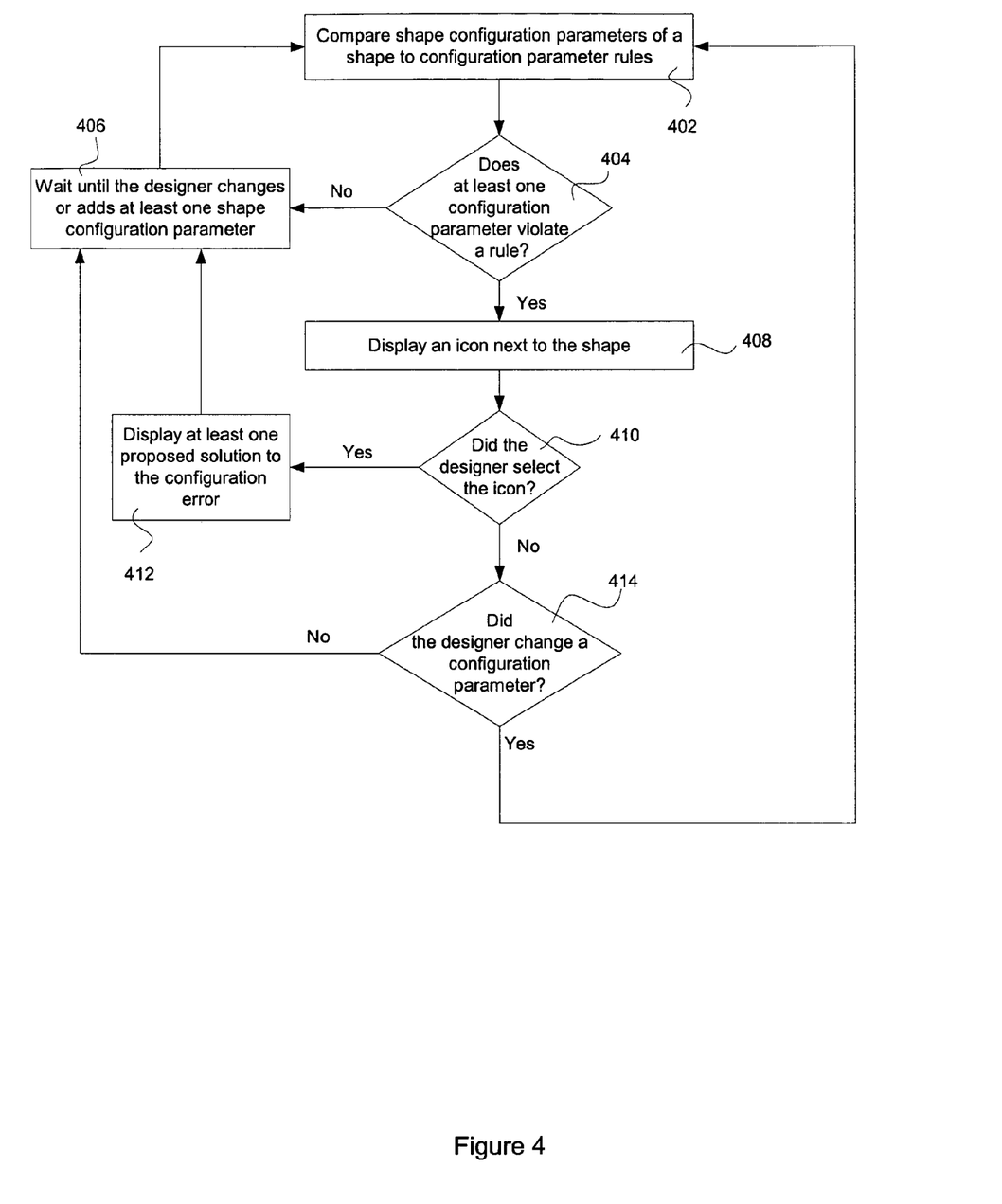
FIG. 4 illustrates a method of evaluating configuration parameters and displaying proposed solutions in accordance with an embodiment of the invention.

FIG. 4 illustrates a method of evaluating configuration parameters and displaying proposed solutions in accordance with an embodiment of the invention. First, in step 402, shape configuration parameters are compared to configuration parameter rules. The shape configuration parameters may be for a single shape or multiple shapes. Next, it is determined whether at least one shape configuration parameter violates a configuration parameter rule in step 404. If no rules are violated, the process waits until the user changes or adds at least one shape configuration parameter in step 406.

Figure 5A:
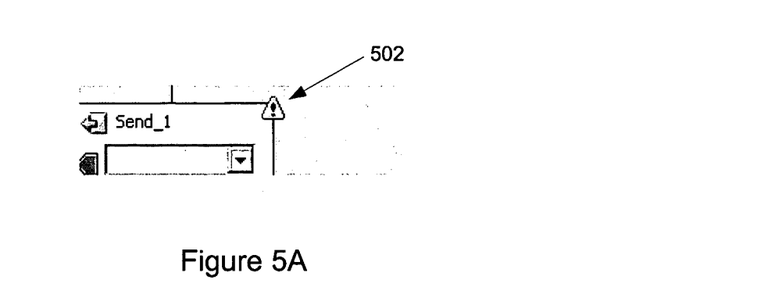
FIG. 5A illustrates an error icon, in accordance with an embodiment of the invention.
Figure 5B:
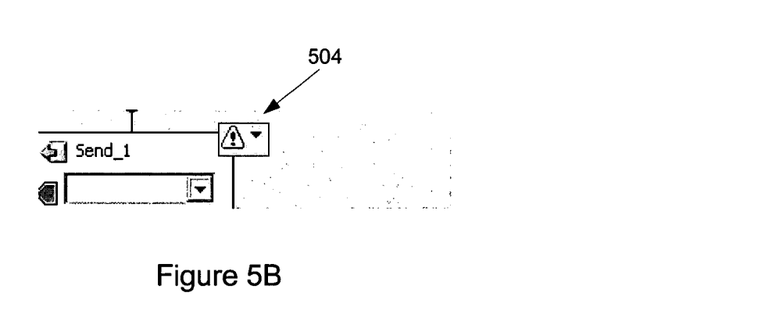
FIG. 5B illustrates an error icon containing a drop down bar, in accordance with an embodiment of the invention.

When a configuration rule is violated, in step 408 an icon is displayed next to the relevant shape or shapes. FIG. 5A illustrates a suitable inconspicuous error icon 502. Error icon 504, shown in FIG. 5B, represents a rollover state of icon 502.

Figure 5C:
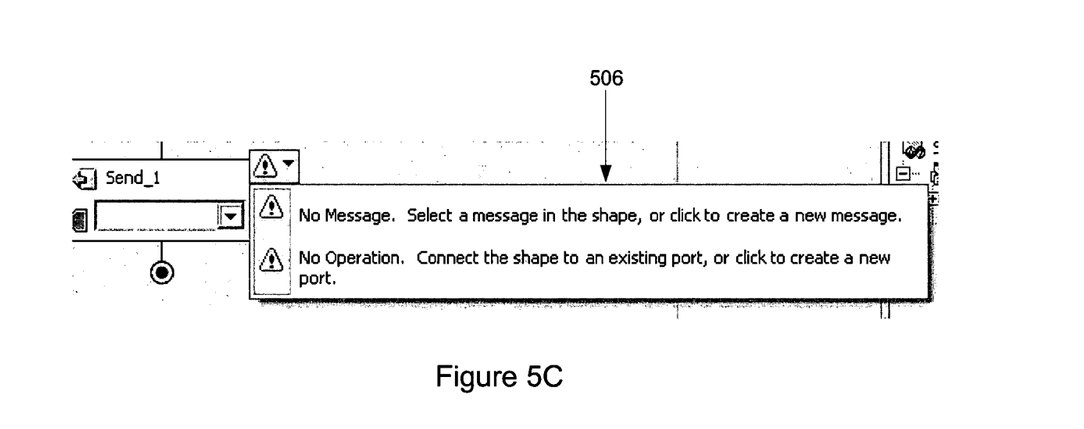
FIG. 5C shows two proposed solutions that are displayed to the user, in accordance with an embodiment of the invention.

When a cursor is positioned over icon 502, icon 502 is replaced with icon 504. Alternatively, icons may be activated with keyboard commands. One advantage of having two different states is to alert the user that there is an actionable behavior on the relevant shape. Displaying a drop down arrow alerts the user that a drop down menu will be displayed when the icon is selected. Error icons 502 and 504 may be placed at the edge of a shape to minimize interfering with the design. Similarly, the icons may be placed next to the relevant shape. In step 410 it is determined whether the user has selected the error icon. When the user selects the error icon, in step 412 at least one proposed solution to the configuration error is displayed to the user. FIG. 5C shows two proposed solutions 506 that are displayed to the user. A proposed solution may include a dialogue box. The dialogue box may prompt the user to initialize a variable or set a configuration parameter. Of course text boxes, drop-down lists, buttons and other user interface controls may also be placed in the drop-down menu itself, avoiding the need to launch a dialog or wizard, and allowing the user to perform editing in place. Other proposed solutions include creating a new design element, adding or connecting a shape, etc. One skilled in the art will appreciate that numerous additional and alternative proposed solutions may be used. The proposed solutions may be a function of the context of the design.

When the user does not select the error icon, in step 414 it is determined whether the user has changed a configuration parameter. When no configuration parameters have been changed, control returns to step 406. When at least one configuration parameter has been changed, control returns to step 402.

The method shown in FIG. 4 may be repeated periodically. As used herein, periodic is not limited to events that occur repeatedly after fixed periods of time. Configuration parameters may be evaluated when the user makes a change to one of the parameters. Of course, configuration parameters may also be evaluated after fixed periods of time, such as every 10 seconds, or when the design application finishes processing all actions in response to a user request and goes idle waiting for the next request.

One skilled in the art will appreciate that FIG. 4 illustrates one exemplary method of evaluating configuration parameters and displaying proposed solutions. Aspects of the invention may be implemented with the steps shown in FIG. 4 arranged in different orders or with alternative and/or substitute steps.

Figure 6A:
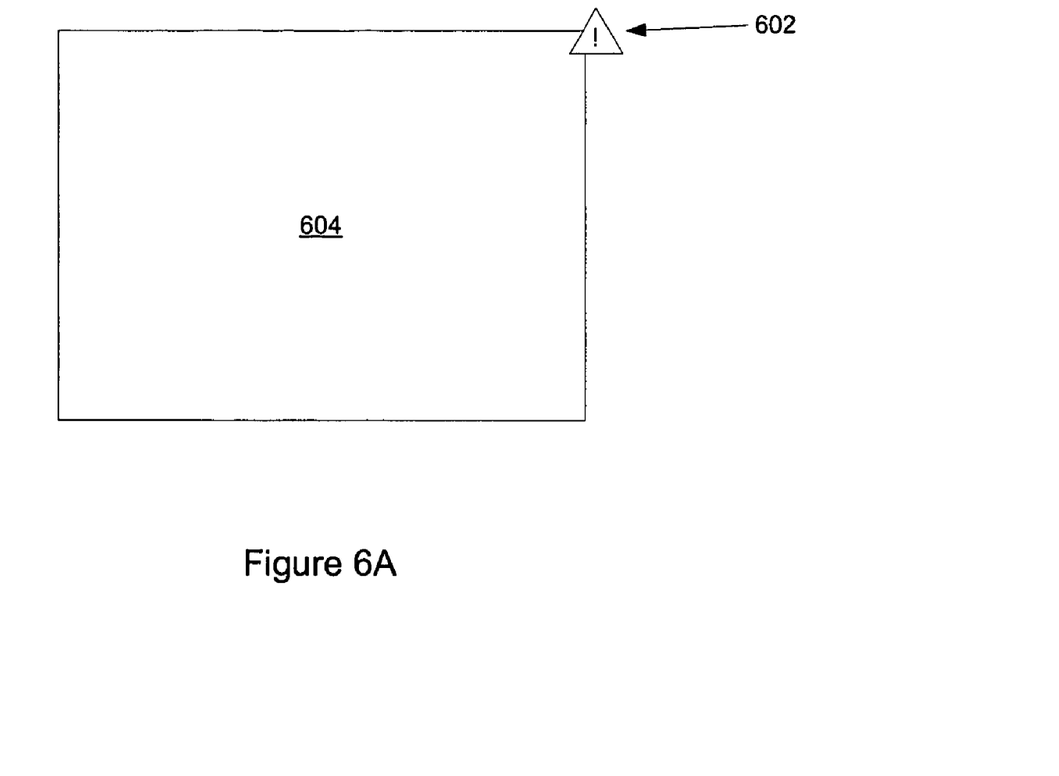
FIG. 6A illustrates an embodiment in which an error icon is placed next to a container shape, in accordance with an embodiment of the invention.
Figure 6B:
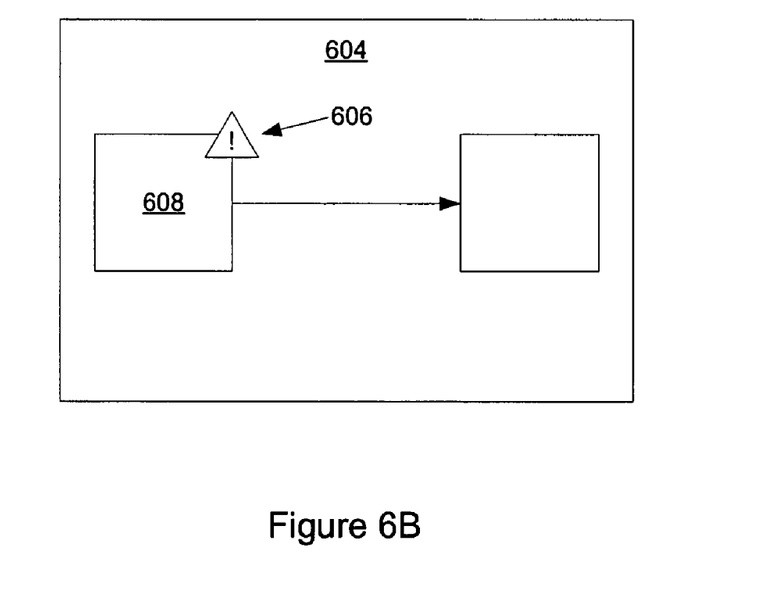
FIG. 6B illustrates an embodiment in which an error icon is placed next to a contained shape, in accordance with an embodiment of the invention.

Aspects of the invention may also be used when one shape contains one or more other shapes ("nested shapes"). FIG. 6A shows an embodiment in which an error icon 602 indicates that there is a configuration error with a container shape 604. A container shape contains one or more shapes. When a user expands container shape 604, the contained shapes are shown with an error icon next to the shape having a configuration error. FIG. 6B shows an embodiment in which an error icon 606 is shown next to contained shape 608.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. In a computing system which includes a visual design surface in the form of a user interface having a plurality of shapes that are selectable by a user, each shape being associated with one or more configuration parameters that define characteristics of software components such as relative positioning of shapes, connections between shapes and other design parameters set by a user, and wherein a user may select and arrange a plurality of the shapes when designing a software application by dragging and dropping them to a design section of the interface, a method of alerting the user to configuration errors that may arise due to inconsistencies between the configuration parameters of one or more of the selected shapes for the software design, the method comprising:

the user selecting a first shape and copying it to the design section of the interface;

the user selecting a second shape and copying it to the design section of the interface so that the second shape is functionally interactive with the first shape;

automatically evaluating with a configuration module the configuration parameters of the first and second shapes by accessing a configuration rules database which is used by the configuration evaluation module to determine whether the configuration parameters of the two functionally interactive shapes in the proposed design violate any configuration rules; and when a configuration rule is determined to have been violated, automatically evaluating any errors using an error module that accesses a common error database which defines at least some errors as being grouped under a common error, and then returning a common error for display to the user in order to limit the number of error messages presented to the user during the design process;

displaying an icon next to a at least one of the first or second selected shapes to represent at least one common configuration error associated with the shape; and in response to a user selecting the icon, displaying at least one proposed solution to the common configuration error presented.

2. In a computing system which includes a visual design surface in the form of a user interface having a plurality of shapes that are selectable by a user, each shape being associated with one or more configuration parameters that define characteristics of software components such as relative positioning of shapes, connections between shapes and other design parameters set by a user, and wherein a user may select and arrange a plurality of the shapes when designing a software application by dragging and dropping them to a design section of the interface, a computer program product for implementing a method of alerting the user to configuration errors that may arise due to inconsistencies between the configuration parameters of one or more of the selected shapes for the software design, the computer program product comprising:

a computer readable medium storing executable instructions for implementing the method, and wherein the method is comprised of:

the user selecting a first shape and copying it to the design section of the interface;

the user selecting a second shape and copying it to the design section of the interface so that the second shape is functionally interactive with the first shape;

automatically evaluating with a configuration module the configuration parameters of the first and second shapes by accessing a configuration rules database which is used by the configuration evaluation module to determine whether the configuration parameters of the two functionally interactive shapes in the proposed design violate any configuration rules; and when a configuration rule is determined to have been violated, automatically evaluating any errors using an error module that accesses a common error database which defines at least some errors as being grouped under a common error, and then returning a common error for display to the user in order to limit the number of error messages presented to the user during the design process;

displaying an icon next to a at least one of the first or second selected shapes to represent at least one common configuration error associated with the shape; and in response to a user selecting the icon, displaying at least one proposed solution to the common configuration error presented.

3. The method of claims 1 or 2, wherein the configuration parameter rules are selected based on a context in which the shapes are being used.

4. The method of claims 1 or 2, further including:

removing the icon when the user has taken one or more actions and the common configuration error no longer exists.

5. The method of claims 1 or 2, wherein the at least one proposed solution is presented in a dialog box associated with the icon.

6. The method of claim 5, wherein the dialog box prompts a user to initialize a variable.

7. The method of claim 5, wherein the dialog box prompts a user to set a configuration parameter.

8. The method of claims 1 or 2, wherein the at least one proposed solution comprises a wizard.

9. The method of claims 1 or 2, wherein the at least one proposed solution comprises creating a new design element.

10. The method of claims 1 or 2, wherein the at least one proposed solution comprises adding a shape.

11. The method of claims 1 or 2, wherein the at least one proposed solution to the common configuration error comprises adding a necessary shape that is not yet included in the design section.

12. The method of claims 1 or 2, wherein the at least one common configuration error comprises configuration parameters that are set by the user in an inconsistent manner.

13. The method of claim 12, wherein the inconsistent configuration parameters are configuration parameters of the same shape.

14. The method of claim 12, wherein the inconsistent configuration parameters are configuration parameters of the first and second shapes.

15. A method as defined in claims 1 or 2 wherein at least one of the shapes is a container shape.

16. The method of claim 15, further including:
   (a) expanding the container shape to display at least the shape contained within the container shape; and
   (b) displaying the icon next to a shape contained within the container shape and that contains the at least one common configuration error.

17. The method of claim 15, wherein the at least one common configuration error comprises a necessary shape that is not connected to the shape contained within the container shape.

18. The method of claim 15, wherein the at least one common configuration error comprises configuration parameters set by the user in an inconsistent manner.

19. The method of claim 18, wherein the inconsistent configuration parameters are configuration parameters of the same shape.

20. The method of claim 18, wherein the inconsistent configuration parameters are configuration parameters of the first and second shapes.

* * * * *